US010836968B2

(12) United States Patent
Aubry et al.

(10) Patent No.: US 10,836,968 B2
(45) Date of Patent: Nov. 17, 2020

(54) METHOD FOR OBTAINING HYDROCARBON SOLVENTS WITH BOILING POINT ABOVE 300° C. AND POUR POINT LOWER THAN OR EQUAL TO −25° C

(71) Applicant: TOTAL MARKETING SERVICES, Puteaux (FR)

(72) Inventors: Christine Aubry, Marly le Roi (FR); Giacomo Grasso, Brussels (BE); Jean-Pierre Dath, Beloeil (BE)

(73) Assignee: Total Marketing Services, Puteaux (FR)

( * ) Notice: Subject to any disclaimer, the term of this patent is extended or adjusted under 35 U.S.C. 154(b) by 164 days.

(21) Appl. No.: 16/031,783

(22) Filed: Jul. 10, 2018

(65) Prior Publication Data
US 2018/0320093 A1 Nov. 8, 2018

Related U.S. Application Data

(62) Division of application No. 14/651,015, filed as application No. PCT/EP2013/075989 on Dec. 9, 2013, now Pat. No. 10,047,305.

(30) Foreign Application Priority Data

Dec. 10, 2012 (FR) ..................... 12 61848

(51) Int. Cl.
  *C10G 69/04* (2006.01)
  *C10G 47/18* (2006.01)
  (Continued)

(52) U.S. Cl.
CPC .............. *C10G 69/04* (2013.01); *B01J 21/04* (2013.01); *B01J 23/882* (2013.01); *B01J 23/883* (2013.01);
(Continued)

(58) Field of Classification Search
CPC ........ C10G 2400/18; C10G 2300/1059; C10G 2300/1074; C10G 2300/301; C10G 2300/304; C10G 69/04
See application file for complete search history.

(56) References Cited

U.S. PATENT DOCUMENTS

| 4,428,825 A | 1/1984 | Ward et al. |
| 4,720,337 A | 1/1988 | Graziani et al. |

(Continued)

FOREIGN PATENT DOCUMENTS

| CN | 101120075 A | 2/2008 |
| JP | 2004518011 A | 6/2004 |

(Continued)

OTHER PUBLICATIONS

Eurasian Office Action from Eurasian application No. 201591109 which claims priority to the same parent application as the instant application, dated Mar. 31, 2017, 4 pages.
(Continued)

*Primary Examiner* — Ellen M McAvoy
(74) *Attorney, Agent, or Firm* — Harness, Dickey & Pierce, P.L.C.; Anthony G. Fussner

(57) ABSTRACT

A method for producing hydrocarbon solvents having a sulfur content of less than 10 ppm, aromatic hydrocarbon content of less than 500 ppm, an initial boiling point higher than or equal to 300° C. and final boiling point lower than or equal to 500° C., for a fraction interval of a maximum of 100° C., and pour point lower than −25° C. according to the standard ASTM D5950, comprising of the following steps of:
  dewaxing of a hydrocarbon fraction having initial boiling point higher than 300° C. derived from the distillation of a gas oil fraction,
  hydrodearomatisation of all or part of the dewaxed effluent, in the presence of a catalyst comprising nickel on
(Continued)

an alumina base, at a pressure ranging from 60 to 200 bar and a temperature ranging from 80° C. to 250° C.,
recovery of the dewaxed and dearomatised fraction,
distillation in fractions of the dewaxed and dearomatised fraction,
recovery of at least one 300° C.+ fraction having pour point lower than −25° C., this fraction having a distillation interval lower than 100° C.

8 Claims, 3 Drawing Sheets

(51) Int. Cl.
| | | |
|---|---|---|
| C10G 47/20 | (2006.01) | |
| B01J 21/04 | (2006.01) | |
| C10G 45/02 | (2006.01) | |
| C10G 45/44 | (2006.01) | |
| C10G 45/58 | (2006.01) | |
| C10G 45/64 | (2006.01) | |
| C10G 65/04 | (2006.01) | |
| C10G 65/08 | (2006.01) | |
| C10G 65/12 | (2006.01) | |
| C10G 73/02 | (2006.01) | |
| C10M 101/02 | (2006.01) | |
| B01J 37/20 | (2006.01) | |
| B01J 23/882 | (2006.01) | |
| B01J 23/883 | (2006.01) | |
| B01J 23/888 | (2006.01) | |
| C09D 11/033 | (2014.01) | |
| C09K 3/00 | (2006.01) | |
| C10G 69/02 | (2006.01) | |
| C10N 20/02 | (2006.01) | |
| C10N 20/00 | (2006.01) | |
| C10N 30/00 | (2006.01) | |
| C10N 40/20 | (2006.01) | |

(52) U.S. Cl.
CPC .............. *B01J 23/888* (2013.01); *B01J 37/20* (2013.01); *C09D 11/033* (2013.01); *C09K 3/00* (2013.01); *C10G 45/02* (2013.01); *C10G 45/44* (2013.01); *C10G 45/58* (2013.01); *C10G 45/64* (2013.01); *C10G 47/18* (2013.01); *C10G 47/20* (2013.01); *C10G 65/043* (2013.01); *C10G 65/08* (2013.01); *C10G 65/12* (2013.01); *C10G 69/02* (2013.01); *C10G 73/02* (2013.01); *C10M 101/02* (2013.01); C10G 2300/1059 (2013.01); C10G 2300/301 (2013.01); C10G 2300/302 (2013.01); C10G 2300/304 (2013.01); C10G 2400/10 (2013.01); C10G 2400/18 (2013.01); C10M 2203/1006 (2013.01); C10M 2203/1065 (2013.01); C10N 2020/011 (2020.05); C10N 2020/015 (2020.05); C10N 2020/02 (2013.01); C10N 2030/40 (2020.05); C10N 2030/43 (2020.05); C10N 2040/20 (2013.01)

(56) References Cited

U.S. PATENT DOCUMENTS

| | | | |
|---|---|---|---|
| 4,842,717 A | 6/1989 | Grootjans et al. | |
| 6,340,430 B1 | 1/2002 | Wood | |
| 6,517,704 B1 | 2/2003 | Carroll et al. | |
| 8,785,354 B2* | 7/2014 | Westelynck | ........... C09D 11/12 507/137 |
| 2003/0211949 A1* | 11/2003 | Guyomar | ............. C09D 11/033 508/110 |
| 2004/0020826 A1 | 2/2004 | Guyomar et al. | |
| 2010/0016195 A1* | 1/2010 | Shirahama | ........... C10M 101/02 508/382 |
| 2011/0282118 A1 | 11/2011 | Shih | |
| 2011/0319539 A1* | 12/2011 | Westelynck | ............ C08L 27/06 524/318 |
| 2012/0010109 A1 | 1/2012 | Westelynck et al. | |
| 2012/0061292 A1* | 3/2012 | Sanchez | ............... C10G 21/003 208/95 |
| 2012/0283492 A1* | 11/2012 | Dalemat | ................ C10G 45/48 585/16 |
| 2013/0001127 A1* | 1/2013 | Aubry | .................... C10G 45/44 208/18 |
| 2013/0253238 A1* | 9/2013 | Hu | ......................... C10G 69/02 585/253 |
| 2016/0281009 A1 | 9/2016 | Aubry et al. | |

FOREIGN PATENT DOCUMENTS

| | | |
|---|---|---|
| JP | 2012-520369 A | 9/2012 |
| RU | 2393201 C2 | 6/2010 |
| WO | WO-02059234 A1 | 8/2002 |
| WO | WO-2006088314 A1 | 8/2006 |
| WO | WO-2007/068800 A2 | 6/2007 |
| WO | WO-2010/103244 A1 | 9/2010 |
| WO | WO-2011061576 A1 | 5/2011 |
| WO | WO-2014090757 A1 | 6/2014 |

OTHER PUBLICATIONS

Taiwan Office Action (and its English translation) for related Taiwan application No. 102145317 which claims priority to the same parent application as the instant application; dated Aug. 17, 2017; 9 pages.
International Search Report and Written Opinion (and its English translation) dated Mar. 21, 2015 for PCT Application No. PCT/EP2013/075989 which is the parent application to the instant application; 35 pages.
Singapore Search Report dated Nov. 13, 2015 (2 pages) and Written Opinion dated Mar. 29, 2015 (7 pgs.) of Singapore application No. 11201504521Y, which claims priority to the same parent application as the instant application.
Japanese office action (and its English translation) dated Oct. 31, 2017 for Japanese application No. 2015-546051 which claims priority to the same parent application as the instant application, 8 pages.
Japanese Office Action for Japanese Application No. 2015-546051 which claims priority to the same parent application as the instant application, dated May 22, 2018, 4 pages.

* cited by examiner

METHOD FOR OBTAINING HYDROCARBON SOLVENTS WITH BOILING POINT ABOVE 300° C. AND POUR POINT LOWER THAN OR EQUAL TO −25° C

This patent application is a divisional of U.S. patent application Ser. No. 14/651,015 filed Jun. 10, 2015 (published as US2016/0281009 on Sep. 9, 2016), which is a U.S. national stage filing under 35 U.S.C. § 371 of International Application No. PCT/EP2013/075989 filed Dec. 9, 2013, which claims priority to and benefit of France Application No. 1261848 filed Dec. 10, 2012. The disclosures of the applications identified in this paragraph are incorporated herein by reference in their entirety.

The present invention relates to a method for producing hydrocarbon solvents free of aromatic compounds and sulfur, with a boiling point that is higher than 300° C. and whose pour point has been considerably lowered down to −25° C. and even lower. This method is particularly suitable for the treatment of gas oil fractions obtained by distillation and refining of crude oil. The present invention also relates to the system for implementing the method and process, the products obtained by the process and finally the application of said products as the solvent, especially in cold environments requiring a very low pour point. These solvents may be used as drilling fluids, lubricants for various industries including automotives, metalworking, as products that are used in the production of phytosanitary products, inks and extender oils for sealants and gaskets, and as viscosity depressants for resin based formulations and pastes based on polyvinyl chloride (PVC).

The chemical nature and composition of fluids known to the person skilled in the art vary widely depending on the intended application and on the original material from which the products are derived. Thus, some are mineral oil based, others are derived by means of chemical processes through polymerisation and/or oligomerisation of olefins. For petroleum based products, the distillation interval as measured by the ASTM D-86 (ASTM International Standard Test Method for Distillation of Petroleum Products at Atmospheric Pressure) or ASTM D 2887 (ASTM International Standard Test Method for Boiling Range Distribution of Petroleum Fractions by Gas Chromatography) (selection depending on the desired initial or final boiling point being below 270° C. or above 400° C.), the pour point as measured by ASTM D 5950 (Standard Test Method for Pour Point of Petroleum Products—Automatic Tilt Method) (with reference to the ASTM D97 Standard Test Method for Pour Point of Petroleum Products controlled at 3 degree test points), the viscosity, density, the sulfur content and aromatic compound content, the density, the aniline point as measured by ASTM D-611 (Standard Test Methods for Aniline Point and Mixed Aniline Point of Petroleum Products and Hydrocarbon Solvents), the method of production of these hydrocarbons, in particular the nature of the raw material distilled in fractions, and flash point constituent the important characteristics that enable them to be distinguished and allow these products to be adapted to the various different applications envisaged.

These hydrocarbon fluids often have narrow boiling point ranges between the Initial Boiling Point (IBP) and the Final Boiling Point (FBP). These ranges are selected according to the intended application. The narrowness of these ranges makes it possible to have a precise inflammation and/or flash point, which are important parameters for reasons related to safety. A narrow fraction range moreover also provides the ability to obtain a better defined viscosity, improved stability thereof and evaporation characteristics suitable for applications requiring a step of drying of controlled duration: it also promotes the production of hydrocarbon fractions with better defined surface tension, whose aniline point and solvent power are more precise. However they are not always the only ones to be taken into consideration, others may be of greater priority depending upon the intended applications.

In order to be applied as solvents in various applications, these fluids must be purified. Purification typically consists of stages of hydrodesulphurisation (and/or hydrocracking) and/or hydrogenation in order to reduce the sulfur content, the nitrogen content and/or to remove the aromatic hydrocarbons, olefins and/or unsaturated rings by converting them into naphthenes. The hydrocarbon fluids thus purified are predominantly aliphatic, and they contain normal paraffins, isoparaffins and naphthenes. For this type of dearomatised fluid, the hydrocarbon product which has been desulphurised and/or denitrogenated, then fractionated, may be hydrogenated so as to saturate all of the aromatic hydrocarbons which are present. The hydrogenation may also be carried out before the final fractionation.

Users first sought essentially hydrocarbon fluids containing low concentrations of aromatic hydrocarbons and extremely low sulfur contents, whose fractions have higher initial boiling points in order to take into account safety considerations or environmental conditions.

It is possible to treat straight run gas oils whose final boiling point (FBP) is 320° C. in order to obtain dearomatised products having pour point less than or equal to 0° C. The treatment of distillation fractions with higher final boiling points, for example higher than 350° C. is equally easy but does not allow the possibility of acquiring sufficiently low pour points in the heavy fraction above 330° C. after dearomatisation. In addition, the content of aromatic hydrocarbons, especially polyaromatic hydrocarbons is higher. The presence of such compounds in hydrocarbons has harmful effects on catalysts of hydrogenation whose life time is thus shortened and performance limited. Sometimes an additional hydrogenation treatment is necessary to further reduce the sulfur content of such products. Thus, treatment of these fractions puts a significant strain on the economics of the hydrogenation processes by dramatically increasing the consumption of hydrogen and the costs of renewal of the catalyst which deactivates rapidly.

Now these hydrocarbon fluids must additionally also present a good compromise between high viscosity and good low temperature properties, that is to say a very low pour point, for example lower than −25° C. and even lower than −30° C., a high solvent power, in particular for printing ink application that requires the dissolution of resins, but also viscous or solid compounds that are used in the production of drilling fluids. These hydrocarbon fluids used as extender oils for the manufacture of silicone based sealants must also have good compatibility with silicone polymers, as well as the capability to lower the viscosity of certain polymers such as PVC when they are used in manufacture of PVC pastes or Plastisols. These hydrocarbon fluids also used in the production of plant protection (phytosanitary) products must still have a viscosity and a degree of purity that are compatible with the toxicity and phytotoxicity constraints that are involved in such use.

It is also a known practice to obtain these fluids from compounds derived from vacuum distillation, in particular vacuum gas oils or steam cracked gas oils which may thus be subjected to other processes such as catalytic cracking coupled with hydrogenation (hydrodesulphurisation, hydrodearomatisation) as described in the patent EP1447437 or even by hydrocracking coupled with hydrogenation, as described in the patents WO03/074634 and WO03/074635. These hydrocracking or catalytic cracking processes favour the concentration of aromatics, in particular polycyclic aromatic hydrocarbons in the 200° C. to 450° C. fractions upon being output from these units, these aromatic hydrocarbons are converted into naphthenes, more particularly highly concentrated polycyclic naphthenes, by hydrogenation of the aromatic ring.

However, the requirements for new fluids that are less toxic or less volatile with moderately high viscosity has led the Applicant to use as fluids dewaxed hydrocarbons for their solvent applications as described in the patent application WO2010/103245. These fluids are obtained from hydrodewaxing units of different gas oil fractions derived from other refining units and from distilling them to make hydrodewaxed fluids at appropriate fraction intervals, possibly after they have been subjected to purification treatment for the removal of sulfur and aromatic hydrocarbons. These hydrodewaxed fluids must satisfy the same characteristics of purity as those required for products derived from crude oil such as sulfur content as measured by ASTM D5453 of less than 10 parts per million (ppm), and a low concentration of aromatic compounds, well under 300 ppm. In addition its characteristics are identical if not better than those of products derived from petroleum. These products have a final boiling point (FBP) that is higher than 300° C.

However, all the criteria are not satisfied across all the fractions and in particular over the fractions with initial boiling point (IBP) higher than 300° C. Indeed, although they satisfy the characteristic properties pertaining to sulfur content, flash point, aromatics and aniline point, these fractions have a very high pour point often higher than −10° C., and even higher than 0° C. which makes them unusable in a cold environment at temperatures lower than −25° C. and even lower than −30° C. These fractions are particularly sought after for applications related to drilling, inks and sealant putty type materials.

In order to resolve this problem, the Applicant has decided to implement a particular hydrodewaxing method that consists of improving the pour point of fractions having an initial boiling point (IBP) higher than or equal to 300° C. as determined by the ASTM D 86, independently of the other fractions.

Among hydrodewaxing methods, there are two methods, one favouring the conversion of paraffins to isoparaffins by a highly isomerising process with very little cracking of normal paraffins and the other based on the mild cracking of treated hydrocarbons, in particular normal paraffins.

The hydrodewaxing process favouring the isomerisation of olefins is carried out in the presence of a zeolite based isomerisation catalyst, for example a ZSM-5 (Zeolite Socony Mobil -5) that supports transition metals or a zeolite ZSM48 that supports platinum/palladium type metals at a temperature ranging from 200° C. to 500° C. under hydrogen pressure ranging from 25 to 200 bar. The hydrofinishing treatment is also obtained under hydrogen pressure in the presence of a metal oxide based catalyst that supports nickel, molybdenum, cobalt, palladium, tungsten and combinations of these metals.

These very elaborate methods of hydrodewaxing are used for the preparation of Diesel or hydrodewaxed oils from heavy hydrocarbon fractions derived from the unit for catalytic cracking of vacuum distillates (FCC—Fluid Catalytic Cracking), such as fractions of Light Cycle Oils (LCO) or petroleum residues (slurry) or even hydrocracked gas oils that provide the ability to lower pour points, without however reaching pour points below −25° C., in particular on fractions beyond 300° C. such as those described in the patent applications and the patents WO2009/154324, WO2009/011479, EP665283, U.S. Pat. No. 6,517,704 and U.S. Pat. No. 6,340,430. It should be noted that these treatments are carried out on broad fractions with fraction intervals corresponding to the desired, conventional Diesel and oil grades. Hydrocarbon fractions referred to as naphthenic hydrocarbons are obtained but wherein the aromatic content is greater than 0.1% by weight, or even greater than 10% by weight (according to the International Petroleum analytical test method IP391: Determination of aromatic hydrocarbon types in middle distillates—High performance liquid chromatography (HPLC) method). The so called "hydrofinishing" treatment process used after the hydrodewaxing process does not allow for conversion of the aromatic hydrocarbons into naphthenes. In these methods, the "isomerising" hydrodewaxing process in the presence of platinum/palladium based catalysts on a zeolitic/alumina based support is preferred to hydrodewaxing with cracking.

The hydrodewaxing method favouring mild cracking of long chain normal paraffins present in the feed, is described in the U.S. Pat. No. 4,781,906, U.S. Pat. No. 4,842,717 and U.S. Pat. No. 5,997,727. It is intended to bring about the lowering as in the other method, of the pour point of gas oils by treatment of the entire gas oil fraction in the presence of a silicalite based catalyst that possibly supports nickel and/or a nickel/tungsten combination under hydrogen at a temperature ranging from 350° C. to 450° C. and under pressure of 1 to 80 bars. This method was applied in particular on a gas oil fraction having a boiling point above 300° C. but for a fraction interval exceeding 100° C. and due to the lowering of the pour point it was not possible to reach a temperature lower than or equal to −25° C., with the pour point approaching only around 0° C.

The present invention aims to obtain the lowering of the pour point to a temperature lower than or equal to −25° C., for solvents derived from gas oil fractions (GO) having initial boiling point higher than or equal to 300° C. according to the ASTM D 86 standard, through the implementation of a method that makes it possible in an integrated manner to produce dearomatised solvents having a boiling point above 300° C., with less than 100° C. fraction interval and containing less than 500 ppm of aromatic hydrocarbons, desulphurised to less than 10 ppm of sulfur and whose solvent power measured by its aniline point is improved. The invention also provides for the integration of the said method in a process for the preparation of all the fractions that may be used as a solvent, having a boiling point between 200° C. and 500° C. and fraction interval below 100° C.

In the present description of the invention, the boiling points, the initial and final distillation points of the fractions, are measured according to the standard ASTM D 86.

The present invention therefore relates to a method for producing hydrocarbon solvents having a sulfur content of less than 10 ppm, aromatic hydrocarbon content of less than 500 ppm, an initial boiling point higher than or equal to 300° C. and final boiling point lower than or equal to 500° C., as determined according to the standard ASTM D86, for a fraction interval of a maximum of 100° C., and pour point lower than −25° C. according to the standard ASTM D5950, comprising of the following steps of:

dewaxing of a hydrocarbon fraction having initial boiling point higher than 300° C. derived from the distillation of a gas oil fraction obtained by any crude oil refining process, and recovery of all or part of the dewaxed effluent, hydrodearomatisation of all or part of the dewaxed effluent, in the presence of a catalyst comprising nickel on an alumina base, at a pressure ranging from 60 to 200 bar and a temperature ranging from 80° C. to 250° C., and said dewaxed effluent being possibly previously desulphurised in advance if its sulfur content is greater than 15 ppm, recovery of the dewaxed fraction, possibly desulphurised, and dearomatised, distillation of narrow fractions of the said dewaxed fraction, possibly desulphurised, and dearomatised, and finally recovery of at least one 300° C.+ fraction having pour point lower than −25° C. that is usable as solvent, this fraction having a distillation interval lower than 100° C.

The term 300° C.+ fraction refers to distillation fractions above 300° C. according to the standard ASTM D 86.

Such a method offers the advantage of preparing heavy hydrocarbon fractions having initial boiling points higher than 300° C. called 300° C.+ fractions, but also of simultaneously preparing other fractions having initial boiling points below 300° C. responding to the specifications of hydrocarbon solvents without aromatic hydrocarbons and free of sulfur. This outcome is achieved by integrating known processes in a new sequence that enables the separation and mixing of the streams before and after treatment.

The feed constituted by a gas oil fraction obtained by any refining process, in particular refers to a fraction selected from among the atmospheric distillation gas oils, vacuum distillation gas oils, hydrocracked gas oils, gas oils from catalytic cracking, gas oils from visbreaking, coking gas oils, gas oils derived from gas deposit, deasphalted gas oils, gas oils derived from the hydrotreating of heavy fractions (Atmospheric Residue and vacuum distillation gas oil or VGO), gas oils with a sulfur content greater than 15 ppm being necessarily desulphurised by hydrotreating and/or hydrocracking prior to treatment according to the method of the invention. It would not be going beyond the scope of the invention if this feed were to be derived from several gas oil fractions referenced in the list here above.

The hydrocarbon fraction having a boiling point higher than or equal to 300° C. is obtained by separation of the gas oil fraction into two fractions, one light fraction (Cl) having the final boiling point below 300° C. and at least one heavy fraction (CL) having the initial boiling point higher than or equal to 300° C., each fraction having a boiling point interval between 300° C. and 500° C. and a distillation interval preferably of less than 85° C.

The step of dewaxing for treating the said heavy fraction (CL) comprises at least one first section for mild cracking in the presence of a silicalite based catalyst, having silica/alumina ratio greater than 130, preferably greater than 150, comprising 0% to 10% by weight of at least one metal from group VIII, and possibly 0% to 10% by weight of a metal from Group VI, and preferably a second section for hydrogenation of olefins in the presence of a silica based catalyst, alumina and/or silica/alumina comprising from 0.1% to 10% by weight of a metal from Group VIII and from 0.1% to 20% of a metal from group VI.

In order to not promote coking of the feedstock and of the effluents produced, or even isomerisation of the olefins formed, the step of dewaxing will comprise at least two sections for mild cracking preferably alternating with two sections for hydrogenation of the olefins formed in the course of the said cracking processes. The first cracking section provides for cracking of the products without causing the formation of coke, the section for hydrogenation providing the ability to saturate the olefins produced, with no secondary isomerisation reaction, the second cracking section provides the ability to continue the cracking while the last hydrogenation section is a finishing section for the saturation of olefins.

More specifically, the dewaxing catalyst is selected from among silicalites having a silica/alumina ratio greater than 200, these silicalites are able to support nickel alone or a nickel/tungsten combination and in that the catalyst for hydrogenation of olefins is an alumina supporting a metal combination selected from among the cobalt/molybdenum, nickel/tungsten, cobalt/tungsten and nickel/molybdenum combinations.

The step of dewaxing is carried out under hydrogen pressure, at a temperature ranging from 150° C. to 450° C. under a total pressure ranging from 10 to 400 bar, preferably at a temperature ranging from 280° C. to 380° C. and a pressure ranging from 20 to 200 bar.

The dewaxed effluent obtained in the step of dewaxing is sent to the additional separation step positioned before the step of hydrodearomatisation. This dewaxed effluent is separated into at least two effluents, one hydrocarbon fraction of C1 to C4 (hydrocarbons having 1 to 4 carbons) and one dewaxed fraction (or CDP) of which at least one part distills above 300° C. and has a pour point lower than or equal to −25° C. It would not be going beyond the scope of the invention, if the separate fractions were more numerous and did not correspond exactly to the fractions specified here below.

In an optional manner depending on the desired product, the dewaxed effluent may be separated into two dewaxed fractions, three dewaxed fractions or four dewaxed fractions:

one hydrocarbon fraction of C 1 to C4 and one hydrocarbon fraction of more than 5 carbon atoms (or C5+);

or one hydrocarbon fraction of C1 to C4 and two hydrocarbon fractions, one of C5 distilling at 150° C. (or C5-150 corresponding to a gasoline fraction) and the other distilling above 150° C. (or 150° C.+);

or one hydrocarbon fraction of C1 to C4 and three hydrocarbon fractions, the first one of C5 distilling at 150° C. (or C5-150), the second distilling from 150° C. to 300° C. (or 150-300 corresponding to a fraction of light gas oil) and the third distilling above 300° C. (or 300° C.+).

With regard to the 300° C.+ fraction, it may be one or more fractions distilling above 300° C. (or 300° C.+).

Upon being output from the additional separation step, the dewaxed fraction with the highest initial boiling point derived from the dewaxed effluent is sent to the step of hydrodearomatisation, the latter comprising of one or more hydrodearomatisation sections.

For example, if the dewaxed effluent is separated into only two fractions, the hydrocarbon fraction of more than 5 carbon atoms (or C5+) is sent to the step of hydrodearomatisation. If the dewaxed effluent is separated into three fractions, the fraction distilling above 150° C. (or 150° C.+) is sent to the step of hydrodearomatisation. Finally, if the dewaxed effluent is separated into four fractions, it is the fraction distilling above 300° C. (or 300° C.+) which is sent to the step of hydrodearomatisation. Eventually, the light fraction (Cl) resulting from the separation of the gas oil fraction into two fractions is mixed in whole or part with the dewaxed fraction sent to the hydrodearomatisation step.

However, in a variant of the said method, the fractions (C5-150) and (150-300) may be dearomatised in the hydroaromatisation unit alone or in an admixture with all or part of the other separated fractions in said step of additional separation.

In a variant of the method according to the invention, at least a part of the heavy fraction (CL) resulting from the separation of the gas oil fraction into at least two fractions may be sent to the step of dewaxing, the other part is mixed with the dewaxed fraction recovered upon being output from the step of separating the dewaxed effluent and sent to the step of hydrodearomatisation. This variant in particular provides the ability to adjust the temperature of the pour point of the said fraction. Preferably, all of the heavy fraction (CL) is sent to the dewaxing step.

Upon being output from the last step of atmospheric distillation, the 300° C.+ fraction with pour point lower than −25° C. is recovered in its entirety for the intended applications, or at least partially, with at least a part that may be recycled in the dewaxed fraction sent to the step of hydrodearomatisation, this recycle advantageously providing the ability to further decrease the aromatic hydrocarbon content of this fraction.

In one embodiment of the method of the invention, the steps of dewaxing and hydrodearomatisation are carried out in a unit with same capacity or in a unit with different capacities. Preferably, these steps are carried out at the same pressure ranging from 60 to 200 bar in a hydrogen atmosphere, at a temperature ranging from 150° C. to 450° C., preferably ranging from 280° C. to 380° C. for the dewaxing step and at a temperature ranging from 80° C. to 250° C. for the hydrodearomatisation step, the temperature of the dewaxed effluent being adjusted before the step of hydrodearomatisation by injection of at least one liquid or gaseous compound with a temperature lower by at least 50° C. than that of the dewaxed effluent.

For this adjustment of the temperature, the liquid or gaseous compound is selected from among hydrogen, the light fraction (Cl) resulting from a boiling point below 300° C. and the 300° C.+ fraction with pour point lower than −25° C. recovered after distillation of the dewaxed effluents, possibly desulphurised, and dearomatised.

A second object of the invention relates to the system for implementing the method comprising of the following:
    a separation unit (DF) in communication with a dewaxing reactor (R1);
    a dewaxing reactor (R1) including at least two catalyst beds for the section for mild cracking (S1) and for the section for hydrogenation of olefins (S2), the said dewaxing reactor being fed by a hydrocarbon fraction having a boiling point higher than 300° C. (or 300° C.+) derived from the separation unit (DF) in two 150° C.-300° C. (or 150-300) and 300° C.+ fractions by distillation of a gas oil fraction derived from any process for refining crude oil;
    at least one hydrodearomatisation reactor (R2) in communication, on the one hand, with the dewaxing reactor (R1) and on the other hand, with at least one atmospheric distillation tower (DA1),
    at least one atmospheric distillation tower (DA1).

In a preferred embodiment, the 300° C.+ fraction is derived from a separation capacity unit (DF) disposed upstream from the dewaxing reactor (R1) separating a gas oil fraction derived from any process for refining crude oil, into two 150° C.-300° C. (or 150-300) and 300° C.+ fractions.

In a preferred embodiment, the system according to the invention comprises a separation unit for separating into two or more fractions (DA2) disposed on the outlet pipe line for the effluents derived from the dewaxing reactor (R1).

For example, the dewaxed effluent may be distilled in the distillation unit DA2 in two dewaxed fractions, three dewaxed fractions or four dewaxed fractions;
    one hydrocarbon fraction of C1 to C4 and one hydrocarbon fraction of more than 5 carbon atoms (or C5+);
    or one hydrocarbon fraction of C1 to C4 and two hydrocarbon fractions, one of C5 distilling at 150° C. (or C5-150) and the other distilling above 150° C. (or 150° C.+);
    or one hydrocarbon fraction of C1 to C4 and three hydrocarbon fractions, the first one of C5 distilling at 150° C. (or C5-150), the second distilling from 150° C. to 300° C. (or 150-300) and the third distilling above 300° C. (or 300° C.+).

In a particular embodiment of the invention, the dewaxing and hydrodearomatisation reactors constitute one and the same reactor, the catalyst beds being divided into two sections, the dewaxing section (SR1) and dearomatisation section (SR2), these two sections being separated by a cavity (30) allowing for the mixing of the dewaxed effluent with the liquid or gaseous compounds meant for adjusting the temperature of the effluents entering the dearomatisation section. This cavity (30) may be empty or filled in whole or part with inert materials promoting the mixing of the gases and liquids.

These effluents are preferably selected from among the hydrogen and/or the recycle of the Cl and/or 300° C.+ fractions with pour point lower than −25° C. recovered after the atmospheric distillation tower (DA1).

A third object of the invention relates to the 300° C.+ fraction obtained according to the method of the invention, having pour point lower than −25° C. and initial boiling point higher than 300° C. and final boiling point lower than or equal to 500° C., with fraction interval lower than 100° C., having a sulfur content of less than 10 ppm and a content of aromatic hydrocarbons of less than 500 ppm and which contains more than 30% by weight of naphthenic compounds and less than 10% by weight of normal paraffins, preferably less than 5% by weight. Mono naphthenic compounds represent more than 20% by weight of the naphthenic compounds.

Preferably, this fraction has a fraction interval lower than or equal to 85° C., preferably a sulfur content of less than 5 ppm and a content of aromatic hydrocarbons of less than 300 ppm, these preferences may be achieved independently of or in combination with each other.

Obviously the term '300° C.+ fraction recovered' refers to one or more 300° C.+ fractions with boiling point of between 300° C. and 450° C. and whose fraction interval width is lower than or equal to 75° C., preferably lower than 65° C.

This/these 300° C.+ fraction or fractions have a pour point below −30° C., a kinematic viscosity at 40° C. less than or equal to 15 mm2/g, preferably ranging from 5 mm2/g to 10 mm2/g and an aniline point lower than 120° C., preferably lower than 100° C., these characteristic features may be attained individually or in combination.

This/these 300° C.+ fraction or fractions comprise less than 35% by weight of hydrocarbons having a chain length of more than 22 carbon atoms, and more than 65% by weight of hydrocarbons having a chain length of less than 22 carbon atoms.

Preferably, the 300° C.+ fraction has a pour point that is lower than or equal to −40° C.

In one embodiment, the 300° C.+ fraction has an initial boiling point that is higher than or equal to 330° C.

In one embodiment, the 300° C.+ fraction has a percentage of polycyclic naphthenes that is less than 20%, preferably less than 10%.

A fourth object of the invention relates to the use of the 300° C.+ fraction(s) as solvent in applications related to phytosanitary products, inks and sealant putty or even as a fluid for metal working. Such applications require low pour points while exhibiting qualities of purity and characteristics of non VOCs (volatile organic compounds, or 'composés organiques volatiles' in French) that are important for their uses in domestic environments.

In order to describe the invention in a more precise manner, figures representing the different forms of implementation of the invention have been provided in support of this description.

Figure 1:
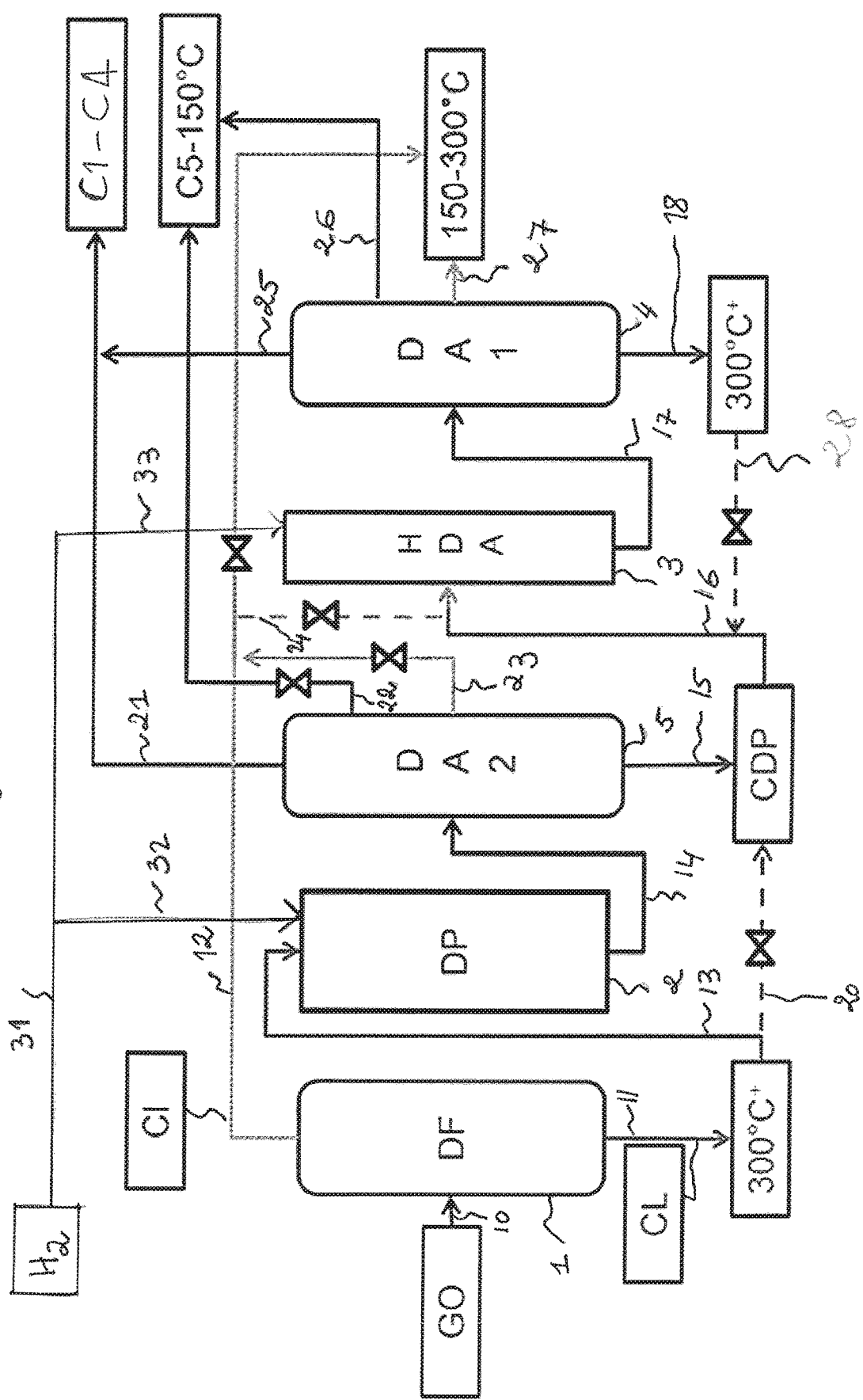
FIG. 1 represents the system of the invention for which two separate reactors (R1) and (R2) are shown respectively for the steps of dewaxing and dearomatisation.

In FIG. 1, a feed stock of gas oil (GO) derived from any process for refining crude oil is introduced through the pipe line (10) into the separator enabling a fractional distillation DF referenced (1) where it is separated into two fractions, one light fraction (Cl) discharged from the fractional distillation unit DF via the pipe line (12) and a heavy fraction CL discharged from the fractional distillation unit DF via the pipe line (11).

This heavy fraction CL is sent to the dewaxing reactor R1 referenced (2) fed in parallel by the hydrogen arriving via the pipe lines (31), and then (32). All of the dewaxed effluent is directed through the pipe line (14) into an atmospheric distillation unit DA2 referenced (5). Two, three or four effluents are distilled according to the choice of recovery process contemplated, only the dewaxed fraction CDP discharged via the pipe line (15) is sent to the step of dearomatisation.

For example, the dewaxed effluent may be distilled in the distillation unit DA2 in two dewaxed fractions, three dewaxed fractions or four dewaxed fractions;
  one hydrocarbon fraction of C1 to C4 also called "fuel gas" is discharged through the pipe line (21) and a hydrocarbon fraction of more than 5 carbon atoms (or C5+) is discharged through the pipe line (15) to the dearomatisation reactor R2 referenced as (3),
  or one hydrocarbon fraction of C1 to C4 discharged through the pipe line (21) and two hydrocarbon fractions, one of C5 distilling at 150° C. (or C5-150) discharged through the pipe line (22) and the other distilling above 150° C. (or 150° C.+) is discharged through the pipe line (15) to the dearomatisation reactor R2 referenced as (3),
  or one hydrocarbon fraction of C1 to C4 discharged through the pipe line (21) and three hydrocarbon fractions, the first one of C5 distilling at 150° C. (or C5-150) discharged through the pipe line (22), the second distilling from 150° C. to 300° C. (or 150-300) is discharged through the pipe line (23) and the third distilling above 300° C. (or 300° C.+) discharged through the pipe line (15) to the dearomatisation reactor R2 referenced as (3).

The dewaxed fraction CDP discharged through the pipe line (15) is sent through the pipe line (16) into the reactor R2 referenced as (3) fed in parallel by the hydrogen coming from the pipe line (31) through the pipe line (33).

The dewaxed and dearomatised effluent is recovered upon being output from the reactor R2 (3) through the pipe line (17) and directed to a distillation unit DA1 referenced as (4) in order to be distilled therein into at least four fractions:
  the 300° C.+ fraction or fractions recovered through the pipe line (18),
  the (150-300) fraction discharged through the pipe line (27),
  the (C5-150) fraction discharged through the pipe line (26),
  and the C1-C4 fraction or "fuel gas" discharged through the pipe line (25).

In a certain mode of implementation, the light fraction recovered through the pipe line (12) upon being output from the DF separator (1) may be introduced in whole or part through the pipe line (24) into the CDP effluent before its entry into the reactor R2 (3).

In addition, the (C5-150) fractions upon being output from the distillation units DA1 and DA2 may advantageously be mixed together with the (150-300) fractions with all or part of the light fraction Cl in the pipe line (12) and upon being output from the distillation unit DA1 (4).

In some preferred embodiments, the heavy fraction CL upon being output from the DF separator (11) is only partially sent to the reactor R1 (2), a part of the said fraction sent through the pipe line (20) being mixed with the CDP dewaxed effluent.

Similarly, if the content of aromatic hydrocarbons is too high in the 300° C.+ fraction or if the viscosity of the CDP effluent is insufficient, a part of the 300° C.+ fraction upon being output from the distillation unit DA1 (4) is recycled via the pipe line (28) into the pipe line (16) directing the CDP effluent into the reactor R2 (3).

Figure 2:
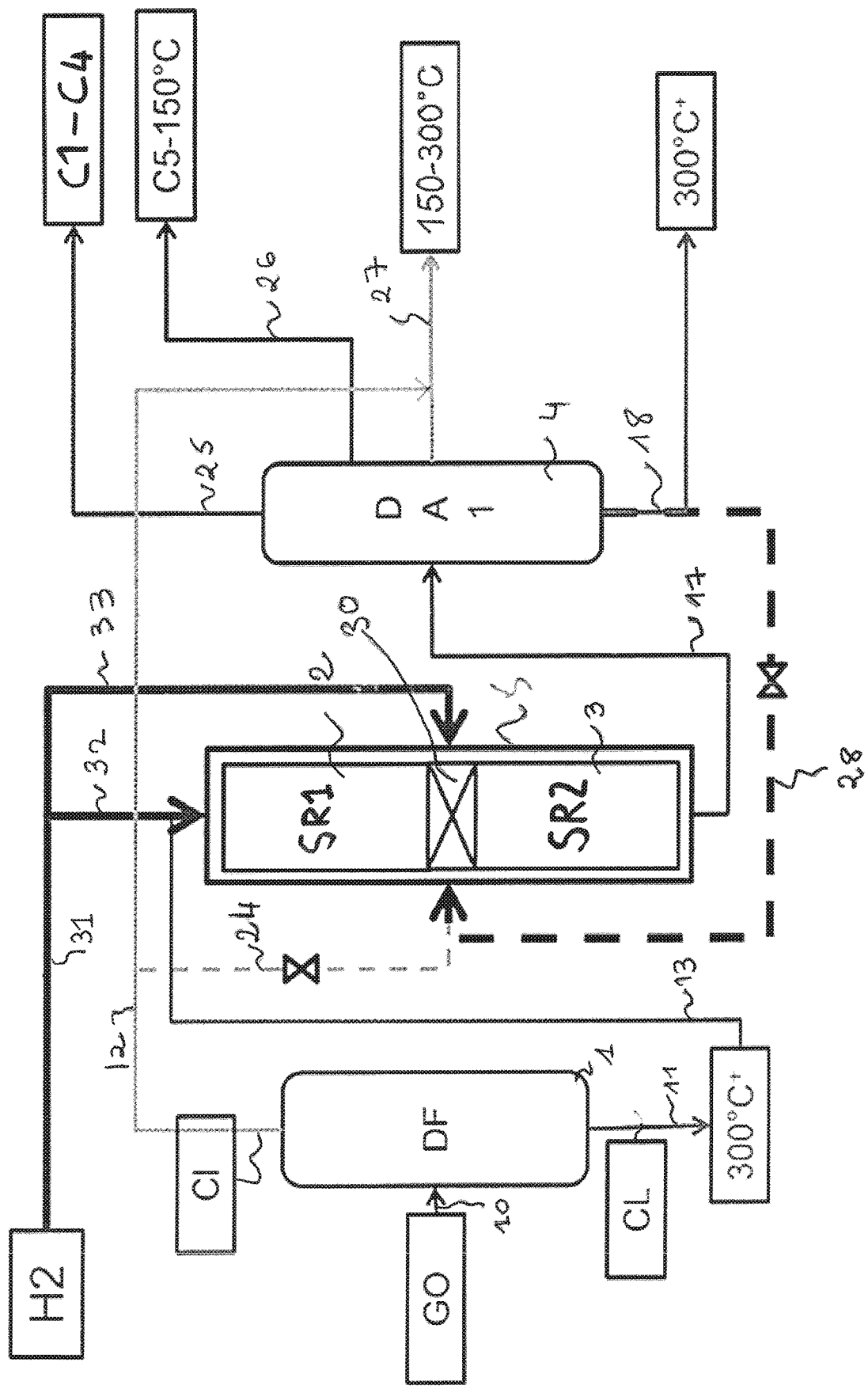
FIG. 2 represents the system of the invention for which a single reactor is shown containing two separate sections (SR1) and (SR2) respectively for the steps of dewaxing and dearomatisation, with one cavity (30) separating these said sections.

FIG. 2 differs from FIG. 1 in that one single reactor (5) is shown for the steps of dewaxing and dearomatisation containing two sections, one for dewaxing SR1 referenced as (2) and one section for dearomatisation SR2 referenced as (3), these two sections being separated by a cavity (30). In this figure, a feed stock of gas oil (GO) derived from any process for refining crude oil is introduced through the pipe line (10) into the DF separator referenced as (1) where it is separated into two fractions, one light fraction (Cl) discharged from DF (1) through the pipe line (12) and one heavy fraction CL discharged from DF (1) through the pipe line (11).

The heavy fraction CL is sent to the section SR1 (2) of the reactor (5) fed in parallel by the hydrogen coming in through the pipe lines (31), and then (32) in order to be dewaxed therein. All of the dewaxed fraction is sent to the section SR2 (3), possibly after being mixed in the cavity (30) separating the two sections with the additional hydrogen arriving from the pipe line (33). This injection of hydrogen is useful to the dearomatisation reaction but also serves the function of adjusting the inlet temperature of the feed stock or dewaxed fraction in the section SR2 (3) by quenching (or quench) thereby enabling the lowering of the inlet temperature of the section SR2 (3).

In a particular embodiment of the invention, it is also possible to inject all or part of the light fraction (Cl) through the pipe line (24) into the cavity (30) in order for it to be dearomatised like the dewaxed heavy fraction (CL). The quantity of hydrogen will be adjusted accordingly as well as the inlet temperature in the section SR2 (3).

As in FIG. 1, the dearomatised and dewaxed effluent is recovered upon being output from the reactor (5) through the pipe line (17) and directed to a distillation unit DA1 referenced as (4) in order to be distilled therein into at least four fractions:

the 300° C.+ fraction or fractions recovered through the pipe line (18), the (150-300) fraction discharged through the pipe line (27), the (C5-150) fraction discharged through the pipe line (26), and the C1-C4 fraction or "fuel gas" discharged through the pipe line (25).

Similarly, if the content of aromatic hydrocarbons is too high in the 300° C.+ fraction or fractions, a part of the 300° C.+ fraction upon being output from the distillation unit DA1 (4) is recycled via the pipe line (28) into the cavity (30) of the reactor (5) in order to be dearomatised therein once again, in section SR2 of the said reactor (5).

Figure 3:
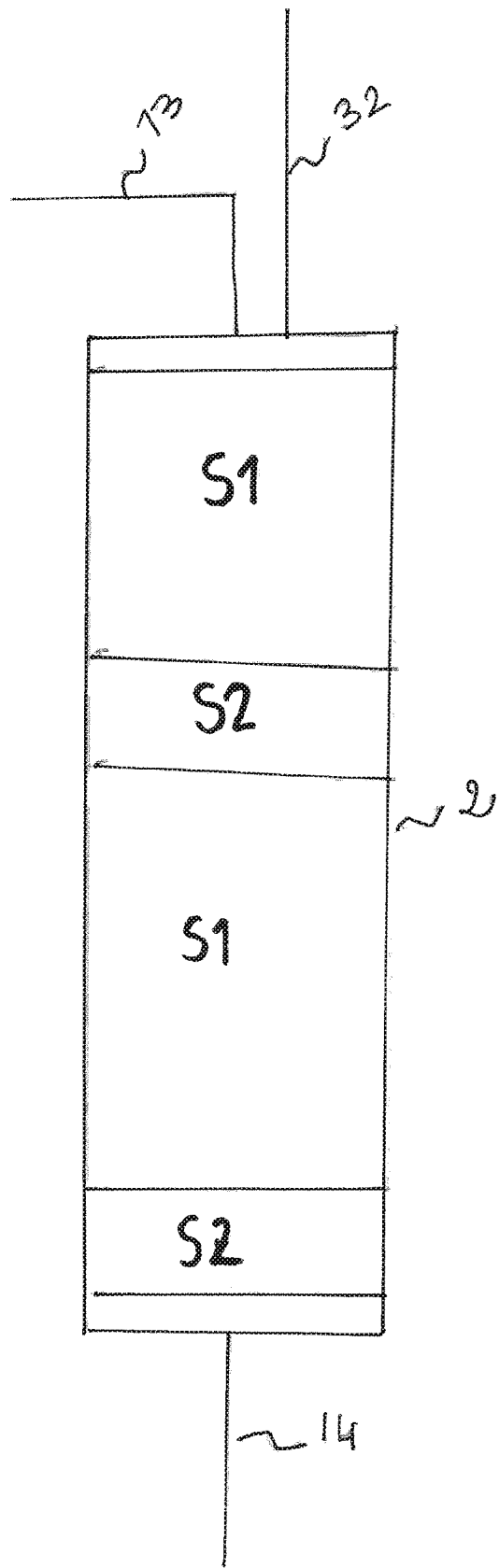
FIG. 3 represents the sections for mild cracking and hydrotreating contained in the dewaxing reactor R1 or SR1 in the FIGS. 1 and 2.

FIG. 3 represents a fraction from the dewaxing reactor (2) in FIG. 1 or from the dewaxing section SR1 (2) of the reactor (5). This fraction presents the distribution in layers of the catalysts for dewaxing (S1) and hydrotreating (S2). S1 is preferably selected from the catalysts for hydrodewaxing with mild cracking, that are silicalite based supporting possibly nickel and possibly tungsten, such as KF1102 marketed by ALBEMARLE. S2 is a conventional hydrotreating catalyst based on a support of metal oxide, alumina, silica, silica/alumina, supporting metals from group (VIII), of the types including nickel, cobalt, molybdenum, tungsten, and preferably nickel/molybdenum-, nickel/cobalt-, and cobalt/molybdenum type combinations. S2 may be KF647 also sold by ALBEMARLE. In a preferred embodiment of the invention, the first and third layers are filled with the dewaxing catalyst S1 and constitute the largest volumes (31% and 46% volume). The second and fourth layers are only filled with S2 each occupying a volume of 11.5%. In this FIG. 3, the heavy fraction (CL) to be dewaxed is introduced into the reactor (2) of FIG. 1 through the pipe line (13), the hydrogen is injected through the pipe line (32) and the dewaxed effluent is recovered through the pipe line (14).

The performance of the present invention will now be illustrated in the following section of the present description, however these examples are not intended to limit the scope thereof.

EXAMPLE 1

This present example describes the preparation of a dewaxed and dearomatised fraction according to the invention, having an initial boiling point higher than 300° C. and whose pour point is below −30° C.

The process is operated as described in FIG. 1 using in the dewaxing reactor (2) the catalysts described here above for FIG. 3. In the dearomatisation reactor, a nickel on alumina catalyst is used, the amount of nickel being greater than 10% by weight and the specific surface area being greater than 140 mm2/g.

The reaction temperature in the dewaxing reactor is 305° C. under a pressure of 30 barg, with a defined Hourly Space Velocity (HSV) corresponding to the ratio of flow rate of the feed stock volume (m3/h) over the catalyst volume (m3/h) of 1 $h^{-1}$ and a hydrogen/feed stock ratio of 250 Nl (NL:normal litre) of hydrogen per litre of hydrocarbon feed stock. In the dearomatisation reactor, the temperature is 245° C., under a pressure of 160 barg, a hydrogen/feed stock ratio of 250 Nl of hydrogen per litre of hydrocarbon feed stock and an HSV of 0.4 $h^{-1}$. The characteristics of the products from the beginning to the end of the reaction chain are shown in Table 1 here below.

TABLE 1

| Characteristics | GO before DF (Gas Oils before Fractional Distillation | 300° C. + Fraction | | |
|---|---|---|---|---|
| | | Before R1 (2) | After DA2 | After R2 and DA1 |
| % by weight Aromatic Hydrocarbons | 17.5 | 9.8 | 13.8 | 127 ppm |
| % by weight n-paraffins | 21.5 | 27.7 | 6.3 | 4.5 |
| % by weight Isoparaffins | 35 | 38.4 | 42.7 | 47.1 |
| % by weight Total Naphthenes | 25.8 | 24.1 | 34.4 | 48.3 |
| % by weight Mono naphthenes | 20.8 | 23.2 | — | 35.8 |
| % by weight olefins ASTM D2710 (gBr$_2$/100 g sample) | 0.52 | 0.35 | 0.7 | <0.05 |
| % by weight Saturated Hydrocarbons <C9 | <0.09 | 0 | <0.1 | <0.1 |
| Viscosity at 40° C. (mm$^2$/g), ASTM D445 | 4.5 | 7.7 | 8.7 | 8.7 |
| Sulfur (ppm) ASTM D5453 | 2 | 2.4 | 3.9 | <1 |
| Nitrogen (ppm) by Chemiluminescence | <0.5 | <0.5 | <0.5 | <0.5 |
| Distillation Fraction (° C.) ASTM D86 | 236- 365 | 296.8- 369.3 | 327.9- 371.4 | 314- 367.3 |
| Pour Point (° C.) ASTM D5950 with reference to D97 (3 degree points) | −4 | +12 | −40 | −40 |
| Aniline Point (° C.) ASTM D-611 | — | — | — | 98.7 |

Thus it is found that by the method of the invention, it is possible to obtain hydrocarbon fluids free of aromatic hydrocarbons and all kinds of pollutants, which may be used as solvents, with distillation fraction at a temperature above 300° C. and whose pour point is well below −30° C. It should be noted that the amount of naphthenes is significantly greater than 40% by weight in these hydrocarbons, the amount of mononaphthenes is significantly greater than 20% by weight. The said pollutants correspond in particular to the olefins, sulfur compounds and nitrogen compounds.

EXAMPLE 2

This example compares the characteristics of the products obtained in Example 1 referenced as X with those of the products obtained from hydrodewaxing mainly by isomerisation of gasoil fractions or a hydrocracked and hydrodearomatised gas oil. These products resulting from the prior art are respectively referenced as T1 and T2.

The comparative characteristics are presented in Table 2 here below.

TABLE 2

| Characteristics | X | T1 | T2 |
|---|---|---|---|
| ppm by weight of Aromatic Hydrocarbons | 127 | 264 | 70 |

TABLE 2-continued

| Characteristics | X | T1 | T2 |
|---|---|---|---|
| % by weight n-paraffins | 4.5 | 0.1 | 16 |
| % by weight Isoparaffins, | 47.1 | 74.2 | 59.9 |
| % by weight Total Naphthenes | 48.3 | 24.8 | 24.1 |
| % by weight Mono naphthenes | 35.8 | 18.9 | 22.4 |
| Sulfur (ppm) by UV method | <1 | <1 | <1 |
| Viscosity at 40° C. (mm2/g), ASTM D445 | 8.7 | 10.3 | 6.1 |
| Distillation Fraction (° C.) ASTM D86 | 314-367 | 334-378 | 305-347 |
| Pour Point (° C.), ASTM D5950 with reference to D97 (3 degree points) | −40 | −35 | 0 |
| Aniline Point (° C.) ASTM D6 11 | 98.7 | 108 | 101 |

It should be noted that with respect to the fraction with boiling above 300° C., the dewaxing provides the ability to reduce the pour point to lower than −30° C. It should also be noted that comparatively between the fractions X and T1, the content of mono naphthenes is very different, for X this is greater than 20% and even greater than 30% by weight, while that it remains significantly lower than 20% by weight for T1. The reduction of the aniline point for the fraction X indicates an improvement of the solvent power.

What is claimed is:

1. A (300° C.+) hydrocarbon fraction having pour point lower than −25° C., initial boiling point higher than 300° C. and final boiling point lower than or equal to 500° C., with fraction interval lower than 100° C., having a sulfur content of less than 10 ppm and with content of aromatic hydrocarbons less than 500 ppm, obtained by a method comprising the following steps:

dewaxing of a hydrocarbon fraction having initial boiling point higher than 300° C. derived from the distillation of a gas oil fraction obtained by any crude oil refining process, and recovery of all or part of the dewaxed effluent, the step of dewaxing comprising at least one first section for mild cracking in the presence of a silicalite-based catalyst, having silica/alumina ratio greater than 130, comprising 0% to 10% by weight of at least one metal from group VIII, and possibly 0% to 10% by weight of a metal from Group VI;

hydrodearomatisation of all or part of the dewaxed effluent, in the presence of a catalyst comprising nickel on an alumina base, at a pressure ranging from 60 to 200 bar and a temperature ranging from 80° C. to 250° C., and said dewaxed effluent being possibly previously desulphurised in advance if its sulfur content is greater than 15 ppm, recovery of the dewaxed fraction, possibly desulphurised, and dearomatised, distillation (DA1) in fractions of the said dewaxed and dearomatised fraction, and finally recovery of at least one 300° C.+ fraction having pour point lower than −25° C. that is usable as solvent, this fraction having a distillation interval lower than 100° C., characterised in that said hydrocarbon fraction contains more than 40% by weight of naphthenic compounds, and less than 10% by weight of normal paraffins, and the mono naphthenic compounds represent more than 20% by weight of the naphthenic compounds.

2. A hydrocarbon fraction according to claim 1, containing less than 5% by weight of normal paraffins.

3. A hydrocarbon fraction according to claim 1, characterised in that it has a pour point that is lower than −30° C., a kinematic viscosity at 40° C. less than or equal to 15 mm²/s and an aniline point below 120° C.

4. A hydrocarbon fraction according to claim 1, characterised in it comprises less than 35% by weight of hydrocarbons having a chain length of more than 22 carbon atoms, and more than 65% by weight of hydrocarbons having a chain length of less than 22 carbon atoms.

5. A hydrocarbon fraction according to claim 1, as a solvent in applications related to phytosanitary products, inks and sealant putty.

6. A hydrocarbon fraction according to claim 3, characterised in that it has a kinematic viscosity at 40° C. ranging from 5 mm²/s to 10 mm²/s.

7. A hydrocarbon fraction according to claim 5, as a fluid for metal working.

8. A (300° C.+) hydrocarbon fraction having pour point lower than −25° C., initial boiling point higher than 300° C. and final boiling point lower than or equal to 500° C., with fraction interval lower than 100° C., having a sulfur content of less than 10 ppm and with content of aromatic hydrocarbons less than 500 ppm, obtained by a method comprising the following steps:

dewaxing of a hydrocarbon fraction having initial boiling point higher than 300° C. derived from the distillation of a gas oil fraction obtained by any crude oil refining process, and recovery of all or part of the dewaxed effluent, the step of dewaxing comprising at least one first section for mild cracking in the presence of a silicalite-based catalyst, having silica/alumina ratio greater than 130, comprising 0% to 10% by weight of at least one metal from group VIII, and possibly 0% to 10% by weight of a metal from Group VI;

hydrodearomatisation of all or part of the dewaxed effluent, in the presence of a catalyst comprising nickel on an alumina base, at a pressure ranging from 60 to 200 bar and a temperature ranging from 80° C. to 250° C., and said dewaxed effluent being possibly previously desulphurised in advance if its sulfur content is greater than 15 ppm, recovery of the dewaxed fraction, possibly desulphurised, and dearomatised, distillation (DA1) in fractions of the said dewaxed and dearomatised fraction, and finally recovery of at least one 300° C.+ fraction having pour point lower than −25° C. that is usable as solvent, this fraction having a distillation interval lower than 100° C., characterised in that said hydrocarbon fraction contains more than 40% by weight of naphthenic compounds, and less than 10% by weight of normal paraffins, and the mono naphthenic compounds represent more than 20% by weight of the naphthenic compounds.

* * * * *